(12) United States Patent
Chang et al.

(10) Patent No.: US 8,014,295 B2
(45) Date of Patent: Sep. 6, 2011

(54) PARALLEL PACKET PROCESSOR WITH SESSION ACTIVE CHECKER

(75) Inventors: Joseph Y. Chang, Reseda, CA (US); Bryan Rittmeyer, Sherman Oaks, CA (US)

(73) Assignee: IXIA, Calabasas, CA (US)

(*) Notice: Subject to any disclaimer, the term of this patent is extended or adjusted under 35 U.S.C. 154(b) by 163 days.

(21) Appl. No.: 12/502,956

(22) Filed: Jul. 14, 2009

(65) Prior Publication Data

US 2011/0013519 A1    Jan. 20, 2011

(51) Int. Cl.
*H04L 12/26* (2006.01)

(52) U.S. Cl. ........................................ 370/241

(58) Field of Classification Search .......... 370/229–231, 370/241, 464, 465; 709/100, 200–207, 227–232
See application file for complete search history.

(56) References Cited

U.S. PATENT DOCUMENTS

| | | | | |
|---|---|---|---|---|
| 5,724,602 | A * | 3/1998 | Tanaka et al. | 712/32 |
| 6,954,463 | B1 * | 10/2005 | Ma et al. | 370/401 |
| 7,095,716 | B1 * | 8/2006 | Ke et al. | 370/230 |
| 7,111,162 | B1 | 9/2006 | Bagepalli et al. | |
| 7,149,230 | B2 * | 12/2006 | Coffin et al. | 370/536 |
| 7,602,775 | B1 * | 10/2009 | Ke et al. | 370/386 |
| 7,809,128 | B2 * | 10/2010 | Li et al. | 379/354 |
| 2004/0215803 | A1 * | 10/2004 | Yamada et al. | 709/231 |
| 2006/0077963 | A1 | 4/2006 | Li et al. | |
| 2007/0115833 | A1 | 5/2007 | Pepper | |
| 2007/0156869 | A1 | 7/2007 | Galchev et al. | |
| 2007/0291654 | A1 | 12/2007 | Pepper | |
| 2008/0112332 | A1 | 5/2008 | Pepper | |
| 2010/0293280 | A1 * | 11/2010 | Namihira | 709/226 |

FOREIGN PATENT DOCUMENTS

EP    1 918 832 A2    5/2008

OTHER PUBLICATIONS

Schulzrinne, H. et al., "RTP: A Transport Protocol for Real-Time Applications", Network Working Group, Request for Comments: 3550, Standards Track, Jul. 2003.
European Patent Office, European Search Report for European Application No. 10251163.1-2413, Mail Date Nov. 5, 2010, pp. 1-7.

* cited by examiner

*Primary Examiner* — Dmitry H Levitan
(74) *Attorney, Agent, or Firm* — SoCal IP Law Group LLP; Steven C. Sereboff; John E. Gunther

(57) ABSTRACT

There are disclosed an apparatus, process, and computer readable storage media for processing received packets. The apparatus may include a plurality of packet processors. A session active checker may identify a session associated with a first received packet and may determine if any other packet belonging to the identified session is currently being processed by any of the plurality of packet processors. The first receive packet may be sent to a selected one of the plurality of packet processors when no other packets belonging to the identified session are currently being processed.

30 Claims, 6 Drawing Sheets

PARALLEL PACKET PROCESSOR WITH SESSION ACTIVE CHECKER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to processing received packets for testing a communications network.

2. Description of the Related Art

In many types of communications networks, each message to be sent is divided into portions of fixed or variable length. These portions may be referred to as packets, frames, cells, datagrams, or data units, all of which are referred to herein as packets. Communications networks that transmit messages as packets are called packet switched networks.

Each packet contains a portion of the original message, commonly called the body of the packet. In addition, each packet contains identification and routing information, commonly called a packet header. The packets are then sent individually over the network through multiple switches or nodes and then reassembled at a final destination using the information contained in the packet headers, before being delivered to a target device or end user. At the receiving end, the reassembled message is passed to the end user in a format compatible with the user's equipment.

Most packet switched networks operate according to a set of established protocols, implemented in a collection of interfaced layers known as a protocol stack. Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing.

A variety of standards are known for use in packet switched networks. One of the best known of these, the TCP/IP suite, is typically used to manage reliable transmission of packets throughout the Internet and other IP networks. A second commonly-used protocol is UDP (User Datagram Protocol). Unlike TCP, UDP provides no error recovery or reliability mechanisms. Because of this simplicity, UDP packets have shorter headers than TCP packets, and thus consume fewer system resources. Among other applications, UDP may be used to transmit real-time audio or video content.

The upper level of the protocol stack is the application layer. The best known application-layer protocol may be HTTP (HyperText Transport Protocol) commonly used to communicate pages on the World Wide Web. Another important application-layer protocol is RTP (Real-time Transport Protocol) which is commonly used to deliver data with real-time characteristics. A typical application of RTP is to deliver audio or video content to one or more recipients participating in an interactive session. RTP is commonly used to deliver VOIP (voice over internet protocol) calls. RTP is normally used with UDP, but may also be used with TCP or other transport-layer protocols. RTP packets are transmitted in sequence, and include an embedded sequence number and/or timestamp that may be used on reception to reconstruct the proper sequence.

Before placing a network into use, the network and the network devices, network media, network segments and network applications included therein, may be tested to ensure successful operation. Network media, segments, devices and applications may be tested, for example, to ensure that they function as intended, comply with supported protocols, and can withstand anticipated traffic demands. Such testing may also be performed on already deployed network devices, network segments and network applications.

In order to test a switched network or a network device included in a communications network, it is often desirable for a network testing system to transmit and/or receive network traffic having a data rate near or equal to the line rate or maximum possible data rate of the network path or device. A network testing system may also process some or all of the received packets to accumulate network performance statistics. Multiple processors may be required to process received packets.

A series of packets transmitted from a single source to a single destination and belonging to a single body of information will be referred to herein as a "session." A session may be, for example, a single direction of an internet telephone call, or a streaming audio or video transmission. A single network path or network device may be capable of transmitting thousands or tens of thousands of sessions concurrently. In this application, "concurrently" means "within the same time" and "simultaneously" means "at exactly the same time."

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
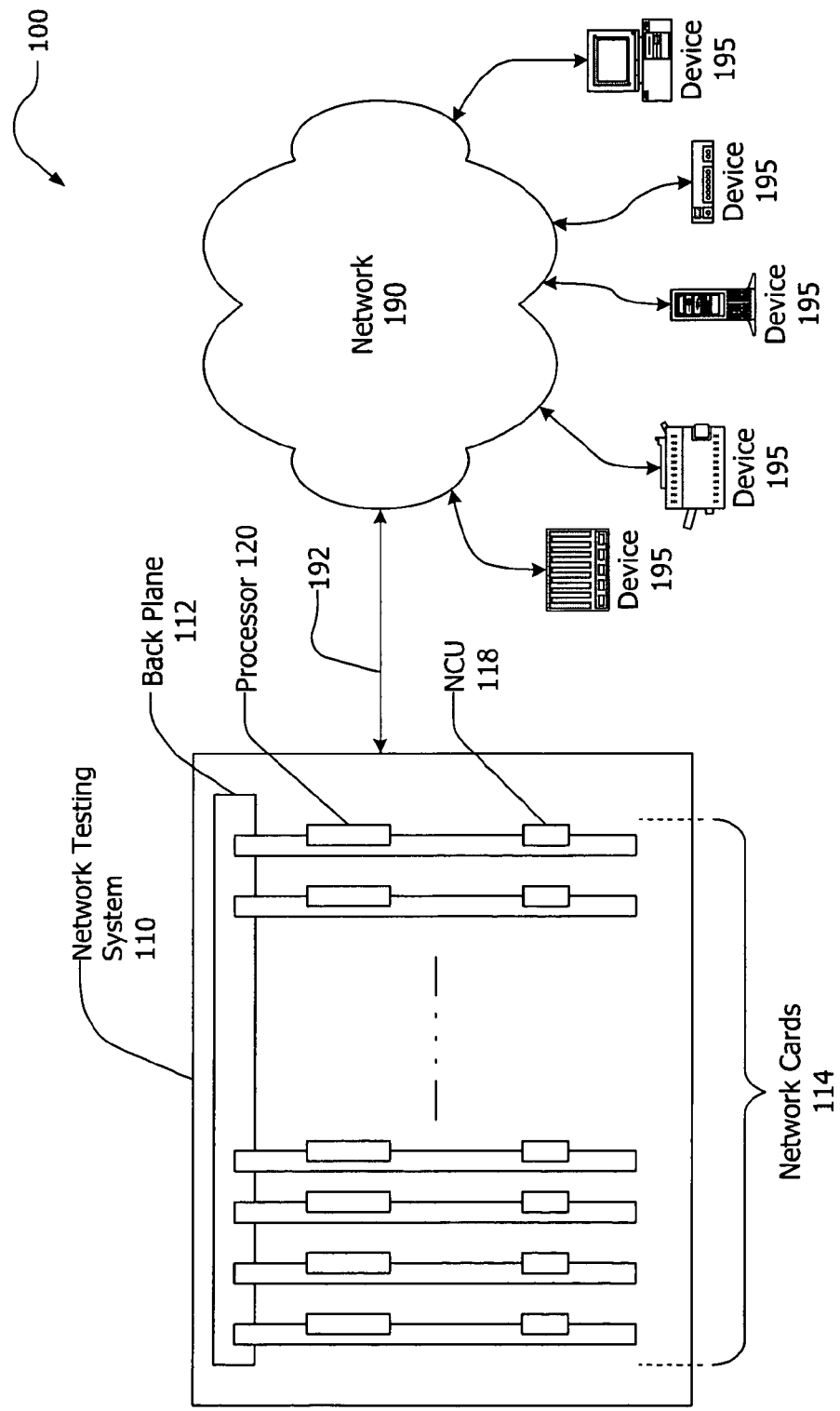
FIG. 1 is a diagram of a network testing environment.

FIG. 1 shows a block diagram of an environment 100 for testing a network. The environment includes network testing system 110 coupled via a network card 114 to a network 190 over a communications path 192. The network testing system 110 may include or be one or more of a performance analyzer, a conformance validation system, a network analyzer, a data unit blaster, a network management system, a combination of these, and/or others. The network testing system 110 may be used to evaluate and/or measure characteristics and performance of a communication line or system, including the throughput of network traffic, the number of dropped data units, jitter, and many others. The network testing system 110 may be used to evaluate the performance of servers, networking devices such as, for example, routers, gateways, load balancers, and others, as well as network application programs and other software.

The network testing system 110 may be in the form of a chassis or card rack, as shown in FIG. 1, or may be an integrated unit. Alternatively, the network testing system 110 may comprise a number of separate units such as two or more chassis cooperating to provide network analysis, network conformance testing, and other tasks. The chassis of the network testing system 110 may include one or more network cards 114 and a backplane 112. The network cards 114 may be coupled with the backplane 112. One or more network cards 114 may be included in the network testing system 110. The network cards 114 may be permanently installed in the network testing system 110, may be removable, or may be a combination thereof.

Network card 114 is coupled with network 190 via a communications path 192. Although only one connection over communications path 192 is shown, each of the network cards 114 may be connected with network 190 over a communications path such as communications path 192. The communications path may be, for example, wire lines such as an Ethernet cable, fiber optic cable, and coaxial cable, and may be wireless.

The network testing system 110 and the network cards 114 may support one or more well known higher level communications standards or protocols including the Real-Time Transport Protocol (RTP) and the User Datagram Protocol (UDP); may support one or more well known lower level communications standards or protocols such as, for example, the 10 and/or 100 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®) and Bluetooth; may support proprietary protocols; and may support other protocols. Each network card 114 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 114 may be referred to as blades, particularly when a processor is included on the network card. The network cards 114 may include one or more processors 120 and one or more network communications units (NCU) 118.

The backplane 112 may serve as a bus or communications medium for the network cards 114. The backplane 112 may also provide power to the network cards 114.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may also be coupled with a display and one or more user input devices which are not shown in FIG. 1.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 195 in the network 190. The network testing system 110 may be used to test and evaluate the network 190 and/or portions thereof, network capable devices 195, application programs running on network capable devices 195, and/or services provided by network 190 and/or network capable devices 195.

The network 190 may be a local area network (LAN), a wide area network (WAN), a storage area network (SAN), or a combination of these. The network 190 may be wired, wireless, or a combination of these. The network 190 may include or be the Internet. The network 190 may be public or private, may be a segregated test network, may be data unit switched or circuit switched, and may be a combination of these. The network 190 may be comprised of a single or numerous nodes providing numerous physical and logical paths for data units to travel.

The network capable devices 195 may be devices capable of communicating over the network 190 and/or listening to, injecting, delaying, dropping, and/or modifying network traffic on network 190. The network capable devices 195 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 195 may include appliances such as refrigerators, washing machines, and the like as well as residential or commercial heating, ventilation, and air conditioning (HVAC) systems, alarm systems, and other devices or systems capable of communicating over a network. One or more of the network capable devices 195 may be devices to be tested and may be referred to as devices under test.

The hardware and firmware components of the network testing system 110 may include various specialized units, circuits, and interfaces for providing the functionality and features described herein. The processors 120 and the NCUs 118 may be implemented as one or more field programmable gate arrays (FPGA), application specific integrated circuits (ASIC), programmable logic devices (PLD), programmable logic arrays (PLA), other kinds of devices, and combinations of these. The functionality and features described herein may be embodied in whole or in part in software which operates on a computer and take the form of firmware, an application program, an applet (e.g., a Java applet), a browser plug-in, a COM object, a dynamic linked library (DLL), a script, one or more subroutines, a device driver, or an operating system component or service. The software may be stored, at least in part, on a computer readable storage medium. The hardware and software of the invention and its functions may be distributed. Additional and fewer units, modules or other arrangement of software, hardware and data structures may be used to achieve the systems and devices described herein.

Figure 2:
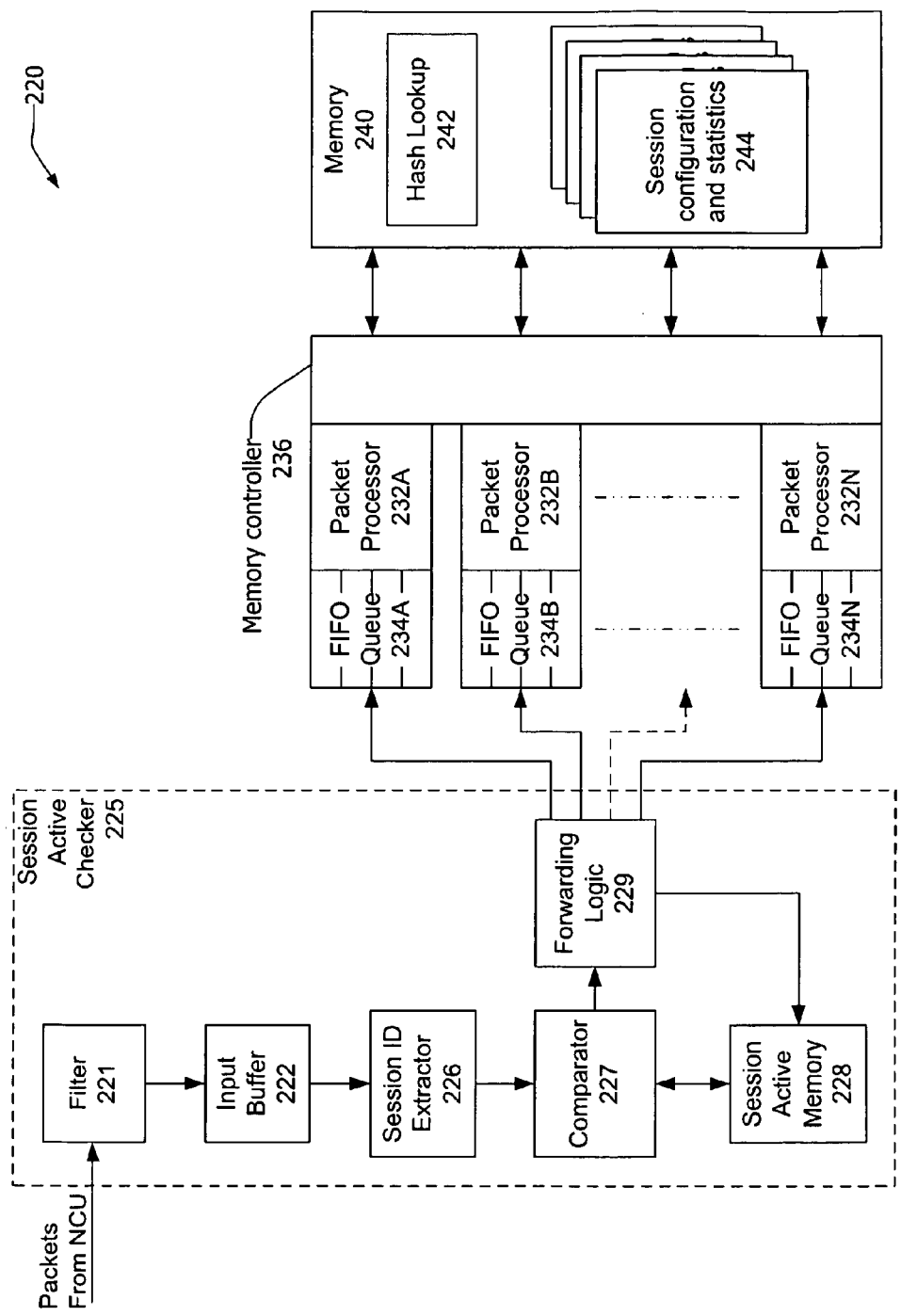
FIG. 2 is a block diagram of a processor for processing received packets.

Referring now to FIG. 2, there is shown a block diagram of a processor 220 for processing received packets. The processor 220 may be all or a portion of a processor, such as the processor 120, disposed on a line card within a network testing system such as the system 110.

The processor 220 may include a plurality of packet processors 232A, 232B, . . . 232N. Each packet processor 232A-N may, at any instant, process a single packet. Each packet processor 232A-N may have an associated first-in first-out (FIFO) queue 234A, 234B, . . . 234N to store packets waiting to be processed. Each FIFO queue 234A-N may have a plurality of storage regions, or slots, to hold packets waiting for processing.

To process a packet, each packet processor 232A-N may extract, from the packet, a session identifier indicating a specific session to which the packet belongs. For example, the session identifier may be the combination of an IP destination address from an IP header portion of the packet and a destination port number from a UDP header portion of the packet. Other portions of the packet header and content may be used to identify the session to which the packet belongs.

The packet processor 232A-N may then retrieve session configuration information and session statistics 244 from a memory 240. The memory 240 may be shared by all of the packet processors 232A-232N through a common memory controller 236. To retrieve the session configuration and session statistics, the packet processor 232A-N may first use a hash function to convert the session identifier to a short address that may be used to access a hash lookup table 242 stored in memory 240. The hash lookup table 242 may provide a pointer to the appropriate session configuration information and session statistics 244, also stored in memory 240.

Once the session configuration information has been retrieved, the packet processor 232A-N may determine if the packet being processed was received correctly. For example, the session configuration information may contain a sequence number of the next packet expected in the session. The packet processor 232A-N may extract the sequence number from the packet being processed and determine if the packet being processed was received in the expected order. The packet processor 232A-N may also confirm one or more checksums within the packet being processed and may perform other checks and comparisons to determine if the packet being processed was received correctly.

The packet processor 232A-232N may then update all or part of the session configuration information and the session statistics stored in the memory 240. For example, if an expected packet sequence number was included in the session configuration information, the sequence number may need to be updated to reflect the arrival of the packet being processed. The session statistics may include statistical data, such as the total number of packets received, the number of errors, and the number of out-of-order packets which must be updated appropriately. The session statistics may also include quantitative performance data such as average or maximum latency and/or jitter which may be updated after each packet is received.

A potential problem may occur if two packets from the same session are processed by two of the packet processors 232A-N concurrently or partially concurrently. For example, assume that packet processor 232A is processing a packet from a specific session and packet processor 232B begins processing a packet from the same session before packet processor 232A has finished. In this case, the packet processor 232B may read some or all of the session configuration information and session statistics from the memory 240 before packet processor 232A has updated that data. Thus the packet being processed by packet processor 232B may erroneously be determined to be received out-of-sequence. Further, the contribution of the packet processed by packet processor 232A to the session statistics may be lost when packet processor 232B updates the session statistics.

For further example, assume that the packet being processed by packet processor 232A is packet number 100 in the session. Packet processor 232A may read session configuration information indicating that packet number 100 is expected next, and that 99 packets have already been received. Upon completion of the processing of packet 100, packet processor 232A may update the information in memory to indicate that packet 101 is expected next and that 100 packets have been received. However, if packet processor 232B, while processing packet 101 of the session, reads the session configuration information and session statistics before they are updated by packet processor 232A, errors may occur. In this case, packet processor 232B may also read session configuration information indicating that packet number 100 is expected next, and that 99 packets have already been received. Upon completion of the processing of packet 101, packet processor 232B will update the information in memory to correctly indicate that packet 102 is expected next. However, packet processor 232B will update the information in memory to erroneously indicate that that packet 101 was received out of order, that packet 100 was lost, and that a total of 100 packets have been received.

To avoid errors such as those described in the previous paragraph, only one packet from a session may be processed concurrently. A conventional approach to ensuring that only one packet from a session is being processed is to have each packet processor 232A-N check with the other packet processors prior to starting processing of a packet. This approach, however, requires communications paths between the processors and may slow the processing speed of each packet processor.

Another conventional approach is to assign each session to a specific packet processor. For example, the session identifier associated with a received packet may be converted, using a hash function or other technique, to a processor identifier such that every packet in a given session is always routed to the same packet processor. This approach guarantees that the packets in a session are always processed sequentially in the order that they were received. However, this approach risks having one processor that is overloaded while other processors are under-utilized.

Additionally, a portion of the memory 240 or another memory may be provided to hold a flag indicating, for each session, whether or not a packet is currently in process. Each processor, prior to processing a packet, may extract a session identification from the packet and access the memory to determine if another packet belonging to the session is currently being processed. If another packet belonging to the session is in process, the packet processor may simply idle, repeatedly accessing the memory, until the processing of the in-process packet is completed. This approach lowers the average processing speed of the idle packet processor and may interfere with the processing of packets by other packet processors attempting to access the memory. Further, since an exhaustive test of a network or network equipment may involve tens or hundreds of thousands of sessions, a significant amount of memory may be required to store the processing status of each session.

In a better solution, the processor 220 may include a session active checker 225 to prevent two or more packets from the same session from being processed concurrently. The session active checker 225 may be adapted to identify a session to which a received packet belongs, to determine if any other packet from the session is being processed by any of the packet processors 232A-N, and to dispose of the received packet in a manner that prevents two packets from the same session being processed concurrently. In this context, "being processed" or "in process" includes every packet stored in any of the plurality of FIFO queues 234A-234N. The session active checker 225 may perform these functions on each new received packet before the received packet is sent to one of the FIFO queues 234A-N, and thus the session active checker 225 may not interfere with the operation of the packet processors 232A-N. The incorporation of the session active checker 225 ensures that any packet processor may process a packet from any session, and thus enables full utilization of the packet processor array regardless of the ordering of the received packets.

The session active checker 225 may include a filter 221, an input buffer 222, a session ID extractor 226, a session active memory 228, a comparator 227, and packet forwarding logic 229.

The input buffer 222 may temporarily store packets received from a NCU (not shown) or an optional filter 221. The filter 221 may discard packets that are not to be processed by the processor 220. For example, the filter 221 may discard packets that are to be processed by another processor (not shown). The filter 221 may pass only a selected portion of the arriving packets, such as only RTP packets, to the input buffer 222. Further, the filter 221 may discard packets that are at least partially unintelligible due to checksum or CRC errors. In the absence of a filter 221, the input buffer 222 may receive all arriving packets from the NCU. The input buffer may function as a first-in first-out queue. The input buffer may be implemented, for example, by a fast static random access memory, a read pointer and a write pointer. The read and write pointers may be registers holding addresses where packet data should be read or written, respectively. The next packet to be read from the input buffer may be termed the "top" packet in the queue. Other memory configurations may be used for the input buffer 222.

The session ID extractor 226 may identify a session to which the top packet in the input buffer belongs. The session ID extractor 226 may include logic to extract and temporarily hold a session identifier embedded in the top packet in the input buffer 222. In this application, the term "logic" is intended to encompass combinatorial logic circuits, sequential elements such as latches and registers, adaptive logic circuits and/or processors controlled by firmware, and other digital circuits. The session identifier may be a portion or all of one or more fields of the top packet. For example, the session identifier may be composed of all or portions of the IP destination address and the UDP destination port. The session ID extractor may include logic to read appropriate fields of the packets and to concatenate or otherwise combine all or portions of the read fields to form the session identifier.

The comparator 227 may compare the session identifier extracted by the session ID extractor 226 with a plurality of session identifiers stored in a session active memory 228. The session active memory 228 may store the session identifiers of all packets that are currently "in process" by any of the packet processors 232A-N, which may be all packets currently held in any of the FIFO queues 234A-N.

The comparator 227 may include a single comparison circuit that compares the extracted session identifier with the plurality of session identifiers stored in the session active memory 228 sequentially. The comparator 227 may include two or more comparison circuits such that two or more comparisons may be done in parallel. The comparator 227 may include enough comparison circuits to allow the extracted session identifier to be compared with all of the session identifiers stored in the session active memory 228 simultaneously.

If the extracted session identifier does not match any of the plurality of session identifiers stored in the session active memory 228, the comparator 227 may determine that no other packet belonging to the same session as the top packet is being processed by the packet processors 232A-N. In this event, the packet forwarding logic 229 may select one of the packet processors 232A-N to process the top packet and forward the top packet to the FIFO queue 234A-N associated with the selected packet processor. The packet forwarding logic 229 may select the packet processor 232A-N having the fewest packets in its associated FIFO queue. Other rationale or algorithms for selecting the packet processor may be used. Upon or while sending the top packet to the selected FIFO queue 234A-N, the packet forwarding logic 229 may write the session identifier of the top packet into the session active memory 228 to indicate that this session is now "in process". The packet forwarding logic 229 may also determine when the processing of a packet is completed and remove the associated session identifier from the session active memory 228.

If the extracted session identifier does match one of the plurality of session identifiers stored in the session active memory 228, the comparator 227 may determine that a second packet belonging to the same session as the top packet is "in process". In this event, the session active checker 225 may be adapted to pause and wait for the processing of the second packet to be completed before sending the top packet to one of the FIFO queues 234A-N.

If the comparator 227 determines that a second packet belonging to the same session as the top packet is "in process", the session active checker 225 may be adapted to identify the packet processor of the plurality of packet processors 232A-N that is currently processing the second packet. The forwarding logic 229 may then send the top packet to the FIFO queue 234A-N associated with the identified packet processor if that queue has an available slot. If the FIFO queue associated with the identified packet processor does not have an available slot, the forwarding logic 229 may wait until a slot in that FIFO queue becomes available.

If the comparator 227 determines that a second packet belonging to the same session as the top packet is "in process", the session active checker 225 may be adapted to skip the top packet and move on to the next packet in the input buffer 222. For example, the session active may logically exchange the top packet with the next packet in the input buffer 222. This exchange may be accomplished by changing pointer values or by setting a flag identifying the top packet as a skipped packet, rather than by relocating the top packet within the input buffer memory. The session active checker may include a skipped packet memory, not shown in FIG. 2, to temporarily hold packets that have been skipped.

All or portions of the processor 220, including the session active checker 225, the plurality of packet processors 232A-N, the plurality of FIFO queues 234A-N, and the memory controller 236, may be contained in one or more field programmable gate arrays (FPGAs) or other programmable logic circuits. Programming code used to configure the one or more FPGAs or programmable logic circuits may be stored on a computer readable storage medium such as a compact disc (CD), digital versatile disc (DVD), tape, or other storage medium. Each FPGA, when programmed using the stored programming code, may be configured as all or a portion of the processor 220. Each FPGA may be programmed each time power is applied to the test system 110 and may revert to an un-programmed state when power is removed.

Figure 3:
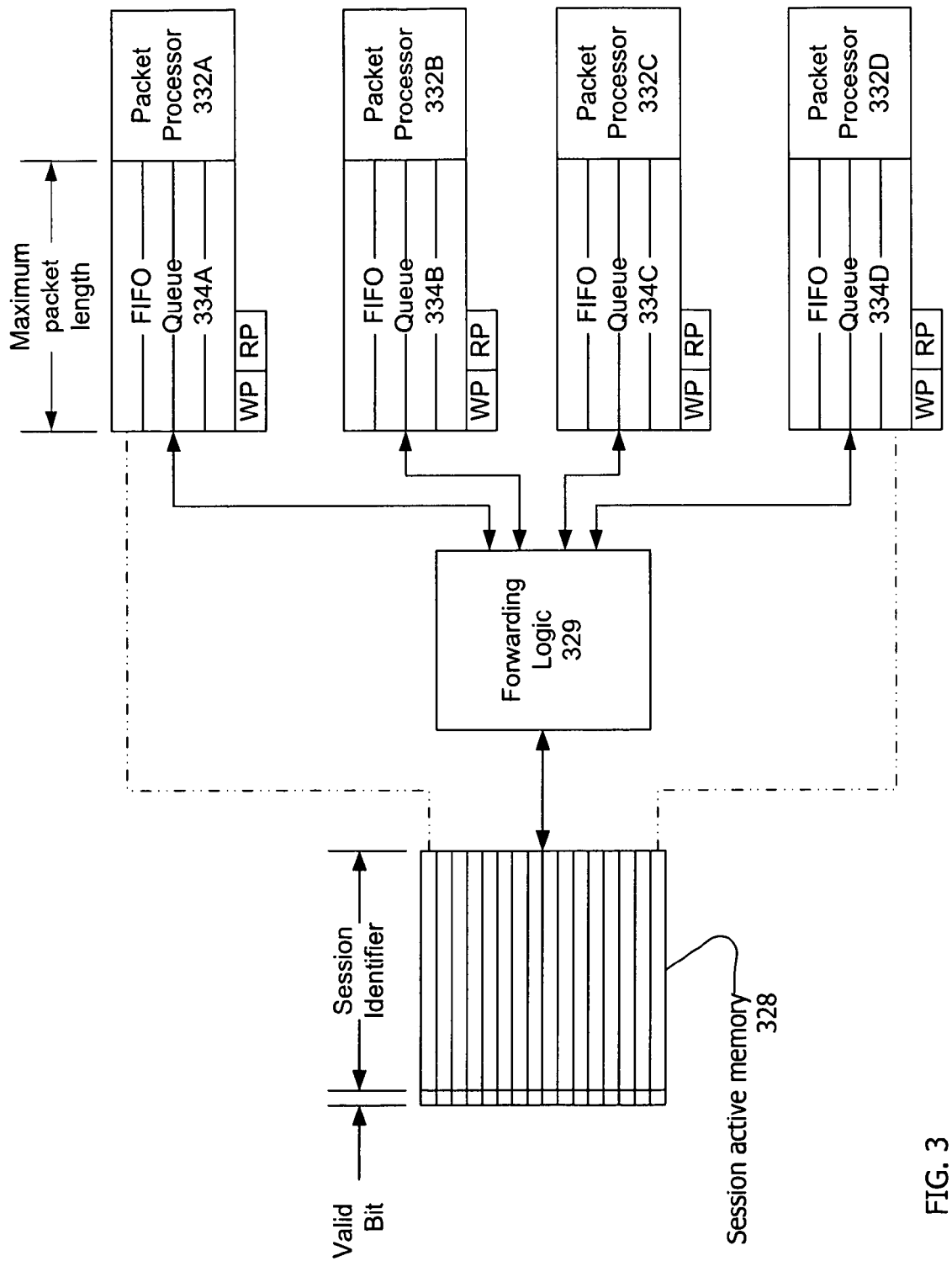
FIG. 3 is a exemplary organization of a session active memory.

FIG. 3 shows an exemplary logical organization of a session active memory 328, which may be suitable for use as the session active memory 228 of the processor 220. In example of FIG. 3, the session active memory is coupled to four packet processors 332A, 332B, 332C, 332D. Each packet processor includes a corresponding FIFO queue 334A, 334B, 334C, 334D. The use of four packet processors and FIFO queues is an example, and a processor, such as the processor 220, may include more or fewer packet processors and FIFO queues.

Each FIFO queue 334A-D may include four slots for holding packets to be processed by the corresponding packet processor 332A-D. In this example, each slot may have a fixed length equal to, or longer than, the longest anticipated packet. For example, RTP packets used to transmit VOIP calls are typically no longer than several hundred bytes. 512-byte FIFO queue slots may be used within a processor for testing a VOIP network or VOIP equipment. Each FIFO queue 334A-D may include a read pointer RP indicating a slot currently being read and processed by the corresponding packet processor 332A-D. Each FIFO queue 334A-D may also include a write pointer WP indicating a slot that will receive the next packet forwarded to the FIFO queue. The use of four slots in each FIFO queue is an example. A processor, such as the processor 220, may include more or fewer slots in each FIFO queue. Other queue structures, such as variable-length packets stored in a continuous memory with pointers to the head of each packet, may also be used.

The session active memory 328 may be adapted to store a session identifier corresponding to each of the slots in the plurality of FIFO queues 334A-D. In the example of FIG. 3, the session active memory 328 may have the capacity to store 16 session identifiers corresponding to four slots in each of four FIFO queues 334A-D. Continuing a previous example, when the session identifier is composed of an IP destination address and a UDP destination port, each session identifier may be 48 bits in length. Additionally, the session active memory 328 may store an additional "valid" bit associated with each session identifier to indicate if the session identifier is currently valid, or is merely old data that has not yet been overwritten.

In the example of FIG. 3, forwarding logic 329 is coupled to the session active memory 328 and to the plurality of FIFO queues 334A-D. When a packet is forwarded to one of the packet processors 332A-D, the forwarding logic 329 may inspect the values of the read pointers RP and write pointers WP of the FIFO queues 334A-334D. The difference between the values of a write pointer and read pointer may indicate the number of empty slots in an associated FIFO queue. Thus the forwarding logic 329 may select which packet processor 332A-D will receive the packet to be forwarded based on the read pointer and write pointer values.

While, or immediately after, the packet is forwarded to the selected packet processor 332A-D, the forwarding logic 329 may write the session identifier of the forwarded packet into the session active memory 328. The forwarding logic 329 may read the write pointer WP of the FIFO queue 334A-D associated with the selected packet processor 332A-D to determine which slot within the FIFO queue will receive the forwarded packet. The forwarding logic 329 may then write the session identifier for the forwarded packet into the corresponding position in the session active memory 328 and set the associated valid bit.

In the example of FIG. 3, the forwarding logic 329 may also monitor the read pointers RP in the FIFO queues 334A-D to determine when the processing of a packet has been completed. Since each read pointer RP points to the FIFO slot containing a packet currently being processed by the associated packet processor 332A-D, a change in the value of a read pointer may indicate the completion of processing of the packet. When a change in the value of a read pointer RP occurs, the forwarding logic 329 may reset the valid bit associated with the corresponding position in the session active memory 328. The change in the value of a read pointer RP and the resetting of the associated valid bit in the session active memory 328 may be concurrent or sequential. In either case, a FIFO slot cannot be reused until both the corresponding session active memory entry is released and the FIFO read pointer is changed.

Description of Processes

Figure 4:
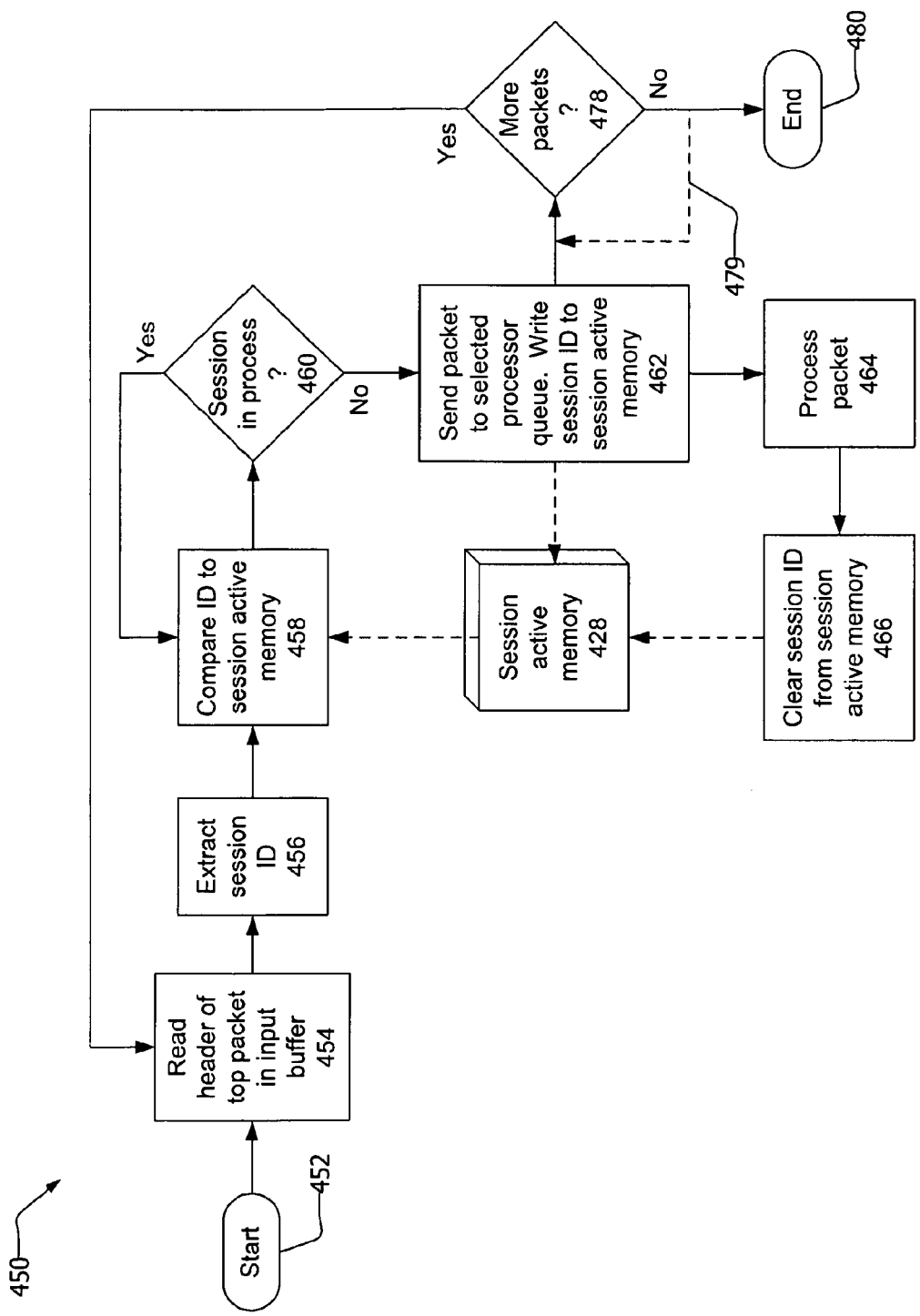
FIG. 4 is a flow chart of a process for processing received packets.

FIG. 4 is a flow chart of a process 450 for processing received packets. Although the flow chart has both a start 452 and an end 480, the process 450 is cyclical in nature and the steps from 454 to 466 are performed for each received packet.

At 454, a top packet may be pulled or read from an input queue which stores one or more packets received from a network interface unit. At 456, a session identifier may be extracted from the packet. The session identifier may be all or portions of one or more fields in the packet header and/or packet payload indicating a specific session to which the top packet belongs.

At 458, the extracted session identifier may be compared to the contents of a session active memory which stores the session identifiers of all packets currently being processed. At 460, a determination may be made if the extracted session identifier is equal to any of the session identifiers stored in the session active memory 428, which would indicate that the specific session is currently in process. When a determination is made at 460 that the specific session is in process, the process 450 may simply loop between 458 and 460 until the specific session is no longer in process.

When a determination is made at 460 that the specific session is not in process, which is to say that the extracted session identifier does not equal any of the session identifiers stored in the session active memory 424, the top packet may be forwarded to one of a plurality of packet processors at 462. The processor to receive the top packet may be selected in accordance with rules to balance the load upon the plurality of processors. For example, the top packet may be sent to a processor that is expected to become available next, or to a processor having the smallest number of packets in an associated input queue, or to a processor selected in some other manner. Additionally at 462, the session identifier of the top packet is written into the session active memory 428 to indicate that the specific session is now in process. A valid flag indicating that the session identifier of the top packet is valid may also be set in the session active memory 428.

After the top packet is forwarded to one of the plurality of packet processors at 462, a determination may be made at 478 if additional packets are stored in the input buffer. If additional packets are available, the process 450 may repeat from 454. If additional packets are not available in the input buffer, the process 450 may loop at 478, as indicated by the dashed line 479, or may end at 480.

After the top packet is forwarded to the selected packet processor at 462, the top packet may be processed at 464. The top packet may not be processed at 464 immediately, since the selected packet processor may include a FIFO queue holding two or more packets in line to be processed. Processing the top packet at 464 may including extracting a session identifier from the top packet, retrieving session configuration information and packet statistics from a memory, determining if the top packet was received correctly, updating the performance statistics to reflect the arrival of the top packet, and other processing. Once the processing at 464 is complete, the content of the session active memory may be changed at 466 to indicate that the top packet is no longer in process. For example, at 466, the session identifier of the top packet may be overwritten with a null session identifier or a valid flag associated with the session identifier of the top packet may be reset.

Figure 5:
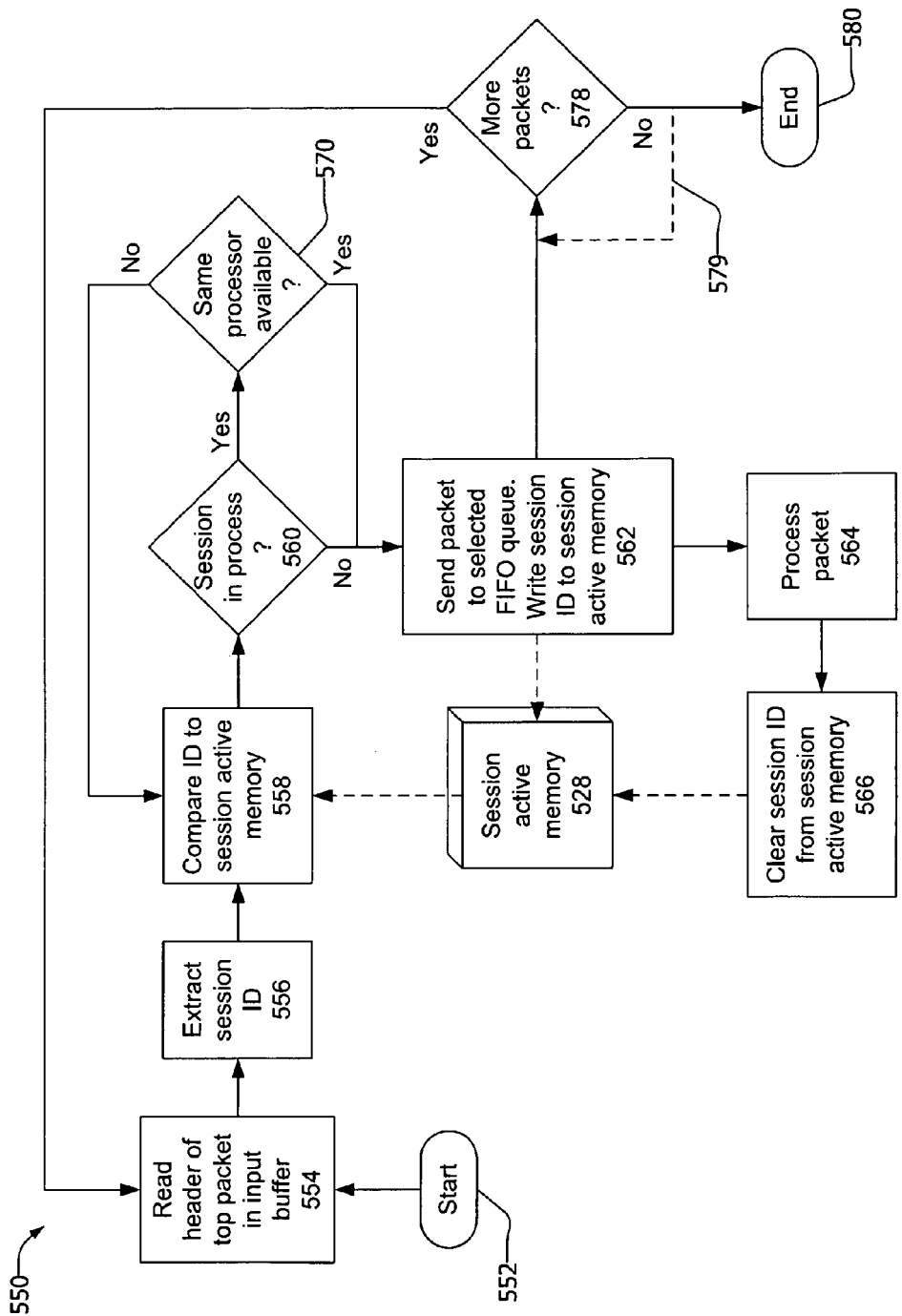
FIG. 5 is a flow chart of a process for processing received packets.

FIG. 5 is a flow chart of another process 550 for processing received packets. The process 550 is generally the same as the process 450, except for the actions taken when a determination is made at 560 that the identified session (to which the top packet belongs) is in process. When a determination is made at 560 that the identified session is in process, a determination may be made at 570 if there is a slot available in a FIFO queue associated with a specific packet processor that is currently processing the specific session. If there is a slot available in the FIFO queue of the specific processor, the top packet may be forwarded to the specific processor at 562. If the FIFO queue of the specific processor is full, the process may loop from 558 until the identified session is no longer in process, or until a slot becomes available in the FIFO queue of the specific processor.

Figure 6:
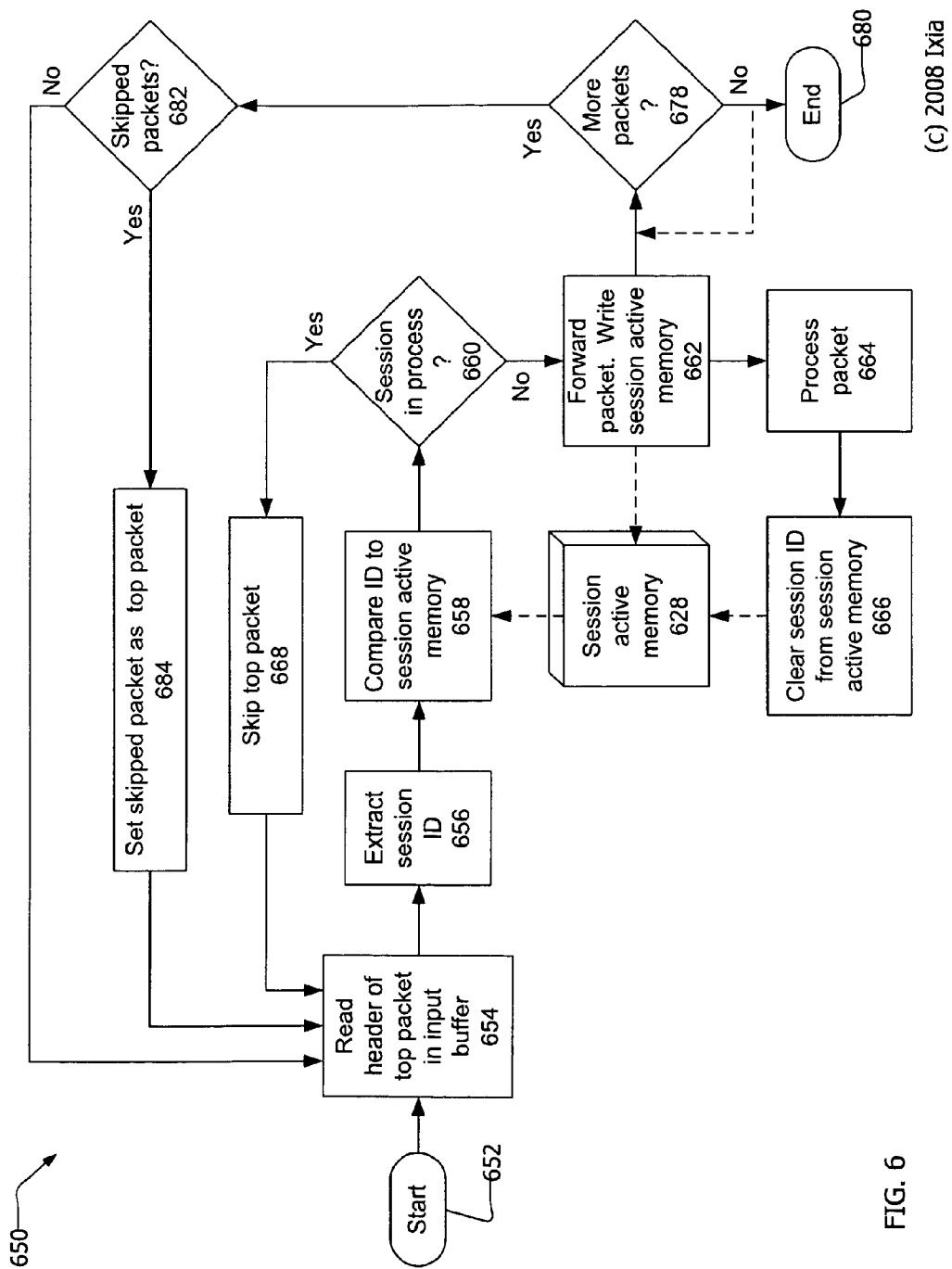
FIG. 6 is a flow chart of a process for processing received packets.

FIG. 6 is a flow chart of another process 650 for processing received packets. The process 650 is generally the same as the processes 450 and 550, except for the actions taken when a determination is made at 660 that the identified session (to which the top packet belongs) is in process. When a determination is made at 660 that the identified session is in process, the top packet may be skipped. The top packet may be temporarily stored and the next packet in the input buffer may be identified as the new top packet at 668. The top packet may be temporarily stored in a memory specifically for holding skipped packets, or the top packet may be left in the input buffer and identified as a skipped packet by a flag or pointer. The process 650 may then repeat from 654 using the new top packet.

After a packet has been forwarded to a packet processor at 662, a determination may be made at 678 if there are more packets, including both newly received packets in the input buffer and skipped packets. If more packets are available, a determination may be made at 682 if there is one or more skipped packets. If a determination is made at 682 that there is a skipped packet, the skipped packet may be defined as the new top packet and the process 650 may repeat from 654. In the event that more than one packet has been skipped, the oldest skipped packet may be defined as the new top packet. If a determination is made at 682 that there are not any skipped packets, the process 650 may repeat from 654 using the next packet in the input buffer as the new top packet.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives.

With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus for processing received packets, comprising:
    a plurality of packet processors
    a session active checker to distribute received packets among the plurality of packet processors
    a plurality of first-in first-out (FIFO) queues to store packets sent from the session active checker to a corresponding one of the plurality of packet processors, each FIFO queue having a predetermined number of slots to store packets
    wherein the session active checker comprises:
        a session active memory adapted to store a plurality of session identifiers corresponding to the slots in the plurality of FIFO queues
        logic that extracts a session identifier from a received packet to identify a session associated with the received packet
        a comparator that compares the session identifier extracted from the received packet with the session identifiers stored in the session active memory to determine if any other packet belonging to the identified session is currently stored in any of the plurality of FIFO queues
        logic that sends the received packet to a selected packet processor of the plurality of packet processors in the case that no other packets belonging to the identified session are currently stored in the plurality of FIFO queues, wherein
        in the case that the session active checker determines that another packet belonging to the identified session is currently stored in the plurality of FIFO queues, the session active checker waits until the processing of the other packet is complete before sending the received packet to the selected packet processor.

2. The apparatus of claim 1, wherein the session active memory stores a valid bit associated with each of the plurality of session identifiers, the valid bit indicating if a packet is stored in the corresponding slot in the plurality of FIFO queues.

3. The apparatus of claim 2, wherein
each of the plurality of FIFO queues includes an associated read pointer and an associated write pointer
the valid bits stored in the session active memory are set and reset in accordance with the values of the read pointers and write pointers associated with the plurality of FIFO queues.

4. The apparatus of claim 1, further comprising:
an input buffer adapted to store a plurality of received packets
wherein, in the case that the session active checker determines that the other packet belonging to the identified session is currently stored in the plurality of FIFO queues, the session active checker temporarily stores the received packet and retrieves another received packet from the input buffer.

5. A process for processing received packets, comprising:
holding at least one received packet in an input buffer
storing, in a plurality of first-in first-out (FIFO) queues, packets for processing by a corresponding plurality of packet processors, each of the plurality of FIFO queues having predetermined number of slots to store packets
storing, in a session active memory, a plurality of session identifiers corresponding to the slots in the plurality of FIFO queues
prior to sending the received packet from the input buffer to one of the plurality of FIFO queues
extracting a session identifier from the received packet to identifying a session associated with the received packet
comparing the session identifier extracted from the received packet with the plurality of session identifiers stored in the session action memory to determine if any other packet belonging to the identified session is currently stored in the FIFO queues
when no other packets belonging to the identified session are currently stored in the FIFO queues, sending the received packet to a selected one of the plurality of FIFO queues
when another packet belonging to the identified session is currently being processed by one of the plurality of packet processors, waiting until the processing of the other packet is complete before sending the received packet to the selected FIFO queue.

6. The process of claim 5, wherein the session active memory stores a valid bit associated with each of the session identifiers, the valid bit indicating if a packet is stored in the corresponding slot in the plurality of FIFO queues.

7. The process of claim 6, wherein
each of the plurality of FIFO queues includes an associated read pointer and an associated write pointer
the process further comprising setting and resetting the valid bits stored in the session active memory in accordance with the values of the read pointers and write pointers associated with the plurality of FIFO queues.

8. The process of claim 5, further comprising:
storing a plurality of received packets in the input buffer
in the case that the session active checker determines that the other packet belonging to the identified session is currently stored in one of the plurality of FIFO queues, temporarily storing the received packet and retrieving another received packet from the input buffer.

9. A non-transitory computer readable storage medium having programming code stored thereon which, when used to program a field programmable gate array, will cause the field programmable gate array to be configured as an apparatus for processing received packets, the apparatus comprising:
a plurality of packet processors
a session active checker to distribute received packets among the plurality of packet processors
a plurality of first-in first-out (FIFO) queues to store packets sent from the session active checker to a corresponding one of the plurality of packet processors, each queue having a predetermined number of slots to store packets
wherein the session active checker comprises:
a session active memory adapted to store a plurality of session identifiers corresponding to the slots in the plurality of FIFO queues
logic that extracts a session identifier from a received packet to identify a session associated with the received packet
a comparator that compares the session identifier extracted from the received packet with the session identifiers stored in the session active memory to determine if any other packet belonging to the identified session is currently stored in any of the plurality of FIFO queues
logic that sends the received packet to a selected packet processor of the plurality of packet processors in the case that no other packets belonging to the identified session are currently stored in the plurality of FIFO queues, wherein
in the case that the session active checker determines that another packet belonging to the identified session is currently stored in the plurality of FIFO queues, the session active checker waits until the processing of the other packet is complete before sending the received packet to the selected packet processor.

10. The non-transitory computer readable storage medium of claim 9, wherein the session active memory stores a valid bit associated with each of the plurality of session identifiers, the valid bit indicating if a packet is stored in the corresponding slot in the plurality of FIFO queues.

11. The non-transitory computer readable storage medium of claim 10, wherein
each of the plurality of FIFO queues includes an associated read pointer and an associated write pointer
the valid bits stored in the session active memory are set and reset in accordance with the values of the read pointers and write pointers associated with the plurality of FIFO queues.

12. The non-transitory computer readable storage medium of claim 9, the apparatus further comprising
an input buffer adapted to store a plurality of received packets
wherein, in the case that the session active checker determines that the other packet belonging to the identified session is currently stored one of the plurality of FIFO queues, the session active checker temporarily stores the received packet and retrieves another received packet from the input buffer.

13. An apparatus for processing received packets, comprising:
a plurality of packet processors
a session active checker comprising logic that
identifies a session associated with a received packet determines if any other packet belonging to the identified session is currently being processed by any of the plurality of packet processors sends the received packet to a selected packet processor of the plurality of packet processors in the case that no other packets belonging to the identified session are currently being processed, wherein in the case that the session active checker determines that another packet belonging to the identified session is currently being processed by a specific packet processor, the session active checker sends the received packet to the specific packet processor, waiting when necessary for a slot to become available in a first-in first-out queue corresponding to the specific packet processor.

14. The apparatus of claim 13, the session active checker further comprising:

logic that extracts a session identifier from the received packet a session active memory that stores session identifiers of all packets currently being processed by any of the plurality of packet processors a comparator that compares the session identifier extracted from the received packet with the session identifiers stored in the session active memory.

15. The apparatus of claim 14, further comprising:

a plurality of first-in first-out queues, each queue adapted to store packets sent from the session active checker to a corresponding one of the plurality of packet processors wherein the session active memory stores session identifiers for all packets stored in the plurality of first-in first-out queues.

16. The apparatus of claim 15, wherein each of the first-in first-out queues includes a predetermined number of slots to store packets the session active memory is adapted to store a plurality of session identifiers corresponding to the slots in the plurality of first-in first-out queues.

17. The apparatus of claim 16, wherein the session active memory stores a valid bit associated with each of the plurality of session identifiers, the valid bit indicating if a packet is stored in the corresponding slot in the plurality of first-in first-out queues.

18. The apparatus of claim 17, wherein each of the plurality of first-in first-out queues includes an associated read pointer and an associated write pointer the valid bits stored in the session active memory are set and reset in accordance with the values of the read pointers and write pointers associated with the plurality of first-in first-out queues.

19. A process for processing received packets, comprising:

holding at least one received packet in an input buffer prior to sending the received packet from the input buffer to one of a plurality of packet processors identifying a session associated with the received packet determining if any other packet belonging to the -session is currently being processed by any of the plurality of packet processors when no other packets belonging to the identified session are currently being processed, sending the received packet to a selected one of a plurality of packet processors when another packet belonging to the identified session is currently being processed by a specific packet processor, waiting until an empty slot is available in a first-in first-out queue corresponding to the specific packet processor, and then sending the received packet to the specific packet processor.

20. The process of claim 19, further comprising:

storing session identifiers of all packets being processed by the plurality of packet processors in a session active memory wherein identifying a session comprises extracting a session identifier from the received packet wherein determining if any other packet belonging to the session is currently being processed by any of a plurality of packet processors comprises comparing the session identifier extracted from the received packet with the plurality of session identifiers stored in the session active memory.

21. The process of claim 20, wherein a plurality of first-in first-out queues are coupled to the plurality of packet processors, each first-in first-out queue adapted to store packets sent from the session active checker to a corresponding packet processor wherein the session active memory stores session identifiers for all packets stored in the plurality of first-in first-out queues.

22. The process of claim 21, wherein each of the first-in first-out queues includes a predetermined number of slots to store packets the session active memory is adapted to store a session identifier corresponding to each of the slots in the plurality of first-in first-out queues.

23. The process of claim 22, wherein the session active memory stores a valid bit associated with each of the session identifiers, the valid bit indicating if a packet is stored in the corresponding slot in the plurality of first-in first-out queues.

24. The process of claim 23, wherein each of the plurality of first-in first-out queues includes an associated read pointer and an associated write pointer the process further comprising setting and resetting the valid bits stored in the session active memory in accordance with the values of the read pointers and write pointers associated with the plurality of first-in first-out queues.

25. A non-transitory computer readable storage medium having programming code stored thereon which, when used to program a field programmable gate array, will cause the field programmable gate array to be configured as an apparatus for processing received packets, the apparatus comprising:

a plurality of packet processors a session active checker comprising logic that identifies a session associated with a received packet determines if any other packet belonging to the identified session is currently being processed by any of the plurality of packet processors sends the received packet to a selected one of the plurality of packet processors in the case that no other packets belonging to the identified session are currently being processed, wherein in the case that the session active checker determines that another packet belonging to the identified session is currently being processed by a specific packet processor, the session active checker waits until an empty slot is available in a first-in first-out queue corresponding to the specific packet processor, and then sends the received packet to the specific packet processor.

26. The computer readable storage medium of claim 25, the apparatus further comprising:

logic that extracts a session identifier from the received packet a session active memory that stores session identifiers of all packets currently being processed by any of the plurality of packet processors a comparator that compares the session identifier extracted from the received packet with the session identifiers stored in the session active memory.

27. The computer readable storage medium of claim 26, the apparatus further comprising:

a plurality of first-in first-out queues, each queue adapted to store packets sent from the session active checker to a corresponding one of the plurality of packet processors wherein the session active memory stores session identifiers for all packets stored in the plurality of first-in first-out queues.

28. The computer readable storage medium of claim 27, wherein each of the first-in first-out queues includes a predetermined number of slots to store packets the session active memory is adapted to store a plurality of session identifiers corresponding to the slots in the plurality of first-in first-out queues.

29. The computer readable storage medium of claim 28, wherein the session active memory stores a valid bit associated with each of the plurality of session identifiers, the valid bit indicating if a packet is stored in the corresponding slot in the plurality of first-in first-out queues.

30. The computer readable storage medium of claim 29, wherein each of the plurality of first-in first-out queues includes an associated read pointer and an associated write pointer the valid bits stored in the session active memory are set and reset in accordance with the values of the read pointers and write pointers associated with the plurality of first-in first-out queues.

\* \* \* \* \*